Sept. 12, 1967   V. H. CARDER   3,341,042
ELEVATOR CONTROL SYSTEM
Original Filed April 6, 1964   2 Sheets-Sheet 1

INVENTOR.
VICTOR H. CARDER
BY
Naylor & Neal
ATTORNEYS

Sept. 12, 1967 V. H. CARDER 3,341,042
ELEVATOR CONTROL SYSTEM
Original Filed April 6, 1964 2 Sheets-Sheet 2

INVENTOR.
VICTOR H. CARDER
BY
Naylor Neal
ATTORNEYS

United States Patent Office 3,341,042
Patented Sept. 12, 1967

3,341,042
ELEVATOR CONTROL SYSTEM
Victor H. Carder, Pacific Grove, Calif., assignor to American Sugar Company, Salinas, Calif., a corporation of New Jersey
Continuation of application Ser. No. 357,524, Apr. 6, 1964. This application Dec. 16, 1966, Ser. No. 607,125
4 Claims. (Cl. 214—512)

ABSTRACT OF THE DISCLOSURE

This application discloses an elevator for transporting cargo to and from freight carrying aircraft where the elevator has tilting means for tilting the upper freight supporting surface of the elevator as the aircraft fuselage pitches in response to changes in load distribution.

*Cross-references to related applications*

Figure 1:
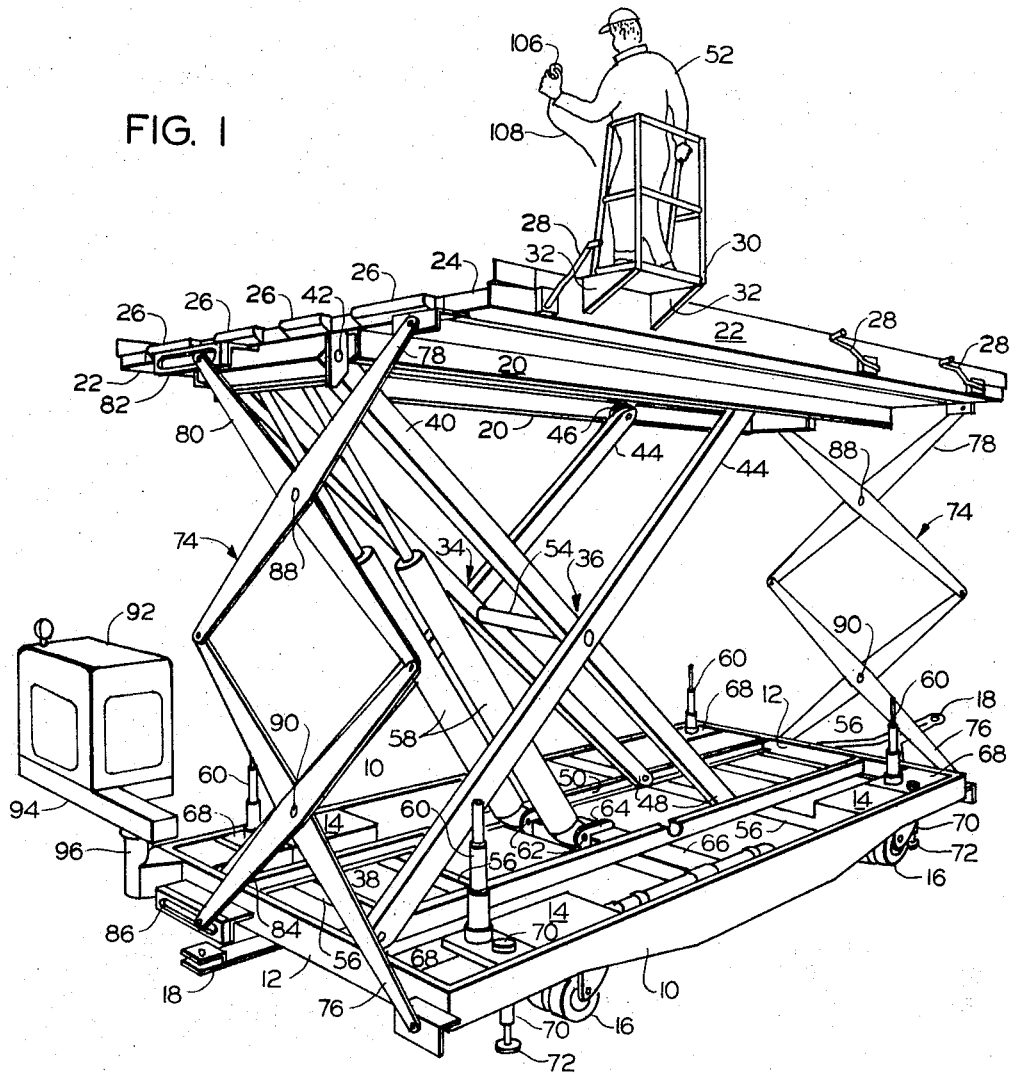

This application relates to improvements in the elevators shown in the applications of Thomas R. Herrmann, Ser. No. 140,516, filed Sept. 25, 1961, now U.S. Patent No. 3,164,274, and Duane N. McCartney and Victor H. Carder, Ser. No. 286,885, filed June 3, 1965, now U.S. Patent No. 3,220,585, and Victor H. Carder, Ser. No. 356,878, filed Apr. 2, 1964, now U.S. Patent No. 3,220,698. A related device is shown in the application of Hugh H. Shaw, Ser. No. 507,424, filed Nov. 12, 1965. All of these patents and applications are commonly owned.

This application is a continuation of my copending application Ser. No. 357,524, filed Apr. 6, 1964 which is being abandoned in favor of this application.

*Brief summary of invention*

In a copending application of Duane N. McCartney and Victor H. Carder, Ser. No. 286,885, filed June 3, 1963, there is disclosed an improved high lift trailer having primary and auxiliary lifting means for facilitating the loading and unloading of freight pallets in aircraft. The present invention relates to a tilting mechanism for a high lift trailer which results in an improved manner of operation of the trailer.

As pointed out in the above identified copending application and in a copending application of Thomas R. Herrmann, Ser. No. 140,516, filed Sept. 25, 1961, it is desirable in the operation of a high lift trailer of this type to provide a trailer having minimum overhead in its lower position to facilitate handling of cargo thereon at a low level and being capable of rapidly lifting the cargo to a maximum elevation for further handling so that the freight carrying aircraft is delayed for only a minimum time during loading and unloading. This is especially true now in an age of jet aircraft with the attendant tighter and tighter competing time schedules among the different airlines. Without modern cargo handling apparatus it is possible for an airline with a fast plane to still present an inferior time schedule to potential customers when compared to an airline having a slower plane but advanced cargo handling apparatus such as described herein.

One potential problem encountered in the operation of a high lift trailer as mentioned above is the tendency of the trailer to roll on its wheels along the ground when loads are transferred between the trailer and an aircraft.

Another major problem encountered in the transportation of cargo on and off aircraft is the movement of the aircraft relative to the high lift trailer in its stationary elevated position. It has been observed that the aircraft has a tendency to pitch or lean longitudinally when the cargo in the aircraft is unevenly distributed. The fuselage of the aircraft instead of remaining parallel to the ground assumes a position with either the nose or tail being closer to the ground than the other. Thus, the cargo hatch or door in the aircraft fuselage is likewise not parallel to the ground or the high lift trailer.

Uneven distribution of cargo is inherent in an aircraft loading or unloading operation since often the freight is pre-assembled into large modules so that only one large module can be handled on the high lift trailer at a time. In a loading operation the initial module is rolled into the cargo door of the aircraft, midway along the length of the fuselage; when the module is then moved to the tail of the aircraft, the tail falls and the nose pitches up so that the sill of the cargo door is no longer parallel to the ground or to the top surface of the high lift trailer. Thus, the next module rolled into the fuselage from the trailer must move over a slanted step where the surface of the trailer is at the same height at the end of the door sill closer to the nose, but the surface of the trailer is substantially above the door sill at the end of the door sill closer to the tail.

The present invention provides a tilting mechanism for a low overhead high lift apparatus of this type which laterally tilts the load conveying means on top of the upper frame to conform to pitching of the aircraft during loading or unloading. This tilting mechanism also lifts the high lift trailer off its wheels to prevent the trailer from rolling during operation. There is further provided a stabilizing means connecting the upper and lower frames for maintaining them substantially parallel in relation to each other even when tilted and with a heavy cargo on the load conveying means on top of the upper frame.

*Brief description of views in drawing*

Figure 2:
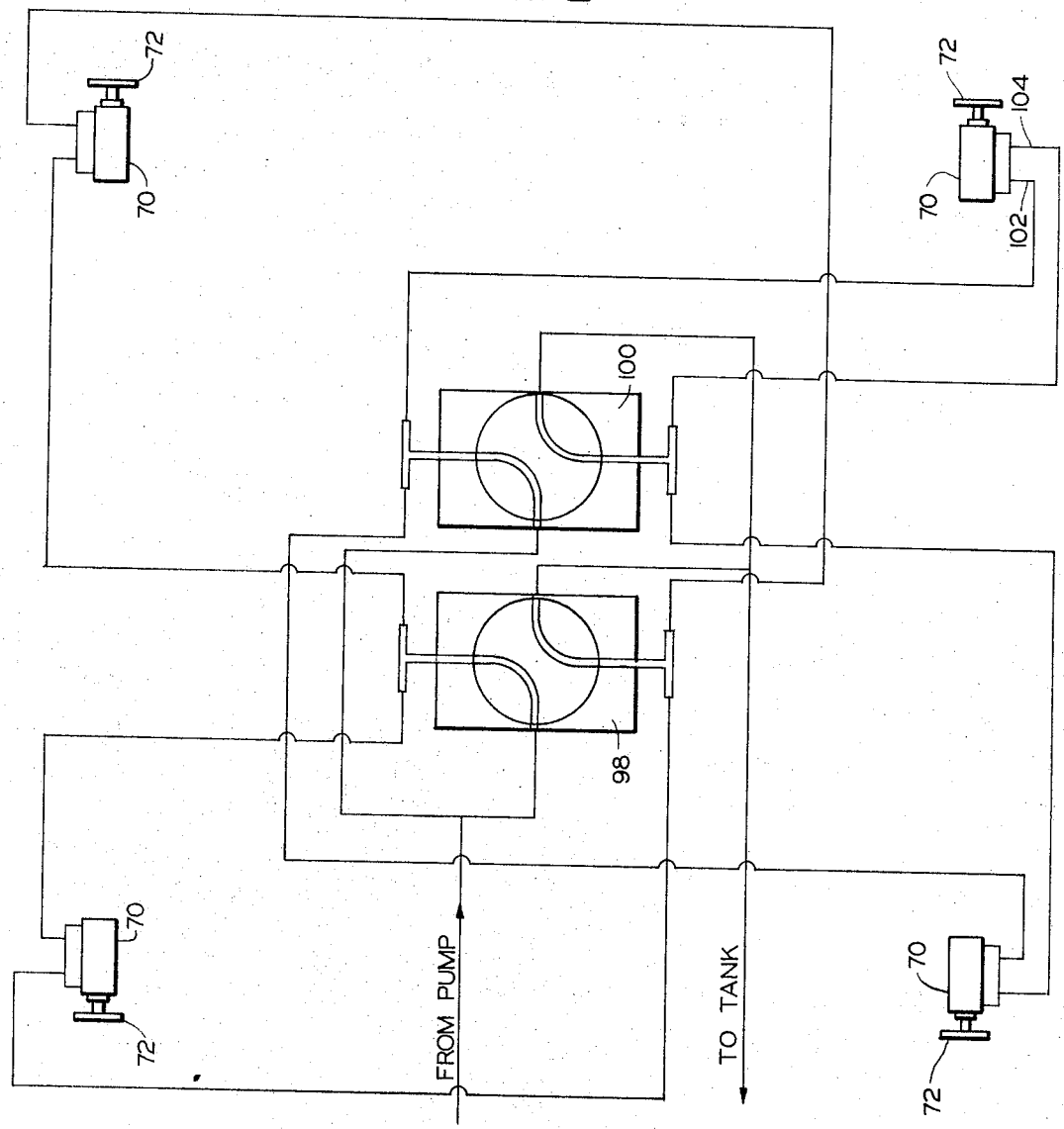

In the attached drawing, FIG. 1 is a perspective view of a low overhead high lift trailer constructed in accordance with the principles of this invention having a tilting mechanism and stabilizing means; and, FIG. 2 is a schematic diagram of the hydraulic system employed to operate the tilting mechanism.

*Detailed description*

Referring now in detail to the drawings, the low overhead high lift trailer illustrated therein includes lower frame having side frame members 10 and end frame members 12 which support wheel wells 14 and ground engaging wheels 16. Trailer hitch members 18 are provided on the front and rear frame members 12 for permitting towing of the trailer in a predetermined direction parallel to the side frame members 10.

An upper frame or load carrying bed is provided with load conveying means substantially coextensive with the plan area of the lower frame, the bed being mounted on a pair of longitudinal channel members 20 with the bed having longitudinal and lateral frame members 22 and 24 respectively, which together define a lattice for supporting a plurality of anti-friction rollers 26. The rollers 26 are here indicated as being arranged for conveying cargo longitudinally of the trailer but are adapted for rearrangement to convey cargo transversely of the trailer. A plurality of operating handles 28 are mounted on the bed for manipulating suitable latch members (not shown) which latch pallets of cargo in predetermined positions on the bed during raising and lowering of the bed. Additionally, an operator's platform 30 is mounted on one side of the bed on brackets 32 to provide a station for an operator 52 when raising and lowering cargo, and means (not shown) are provided for removing the platform 30 and relocating it on one end of the bed or frame when the bed is adjusted to transport cargo transversely thereof.

The load conveying means is mounted on the upper frame to be maintained parallel to the lower frame by two pairs of scissors lift arms 34 and 36 where each pair of arms has a lower arm end 38 pivotally connected to the lower frame and upper arm end 40 pivotally connected to the upper frame at a pivot tube 42, an upper arm end 44 which slidably engages one of the channels 20 by means of a flanged wheel 46 received in the channel 20, and a lower arm end 48 slidably engaging a longitudinal channel 50 on the lower frame by means of a flanged wheel (not shown) mounted thereon. The scissors arms are pivotally connected together at their midpoints at a pivot shaft 54, and the inner arm of each pair is spaced inwardly from the outer arm by a spacer (not shown) which is of a width at least as great as the widths of the channels 50 and which permits the scissors arms of each pair to assume a position parallel to each other when the bed is fully lowered. In this fully lowered position, the frame members of the bed rest upon the frame members of the lower frame, and the scissors arms, the channels 20 and the channels 50 lie in substantially the same plane. It should be noted that auxiliary frame supports 56 extend transversely between the side frame members 10 underneath the channels 50 to provide sufficient support for the channels 50 that they may carry the load of the scissors arms throughout the various positions of elevation of the bed.

The lifting thrust for raising the upper frame above the lower frame is provided by primary hydraulic rams 58 and secondary hydraulic rams 60 which are connected to a source of power. The primary rams 58 are pivotally connected at their upper ends to the pivot tube 42 and are pivotally connected at their lower ends at pivot pin 62 on brackets 64 which are in turn mounted on a transverse cross-brace 66 supported on the side frame members 10 slightly below the level of channels 50. The auxiliary rams 60 are mounted in brackets 68 in the lower frame adjacent the wheel wells 14 and near the four corners of the lower frame positioned to engage the longitudinal frame members 22 of the upper frame when the upper frame is lowered to a position approaching the lower frame. Also mounted in brackets 68 are tilt rams 70 which face downward and have feet 72 to act against the ground. The double acting rams 70 function in pairs for the lateral tilting feature and are capable of lifting the entire unit with a heavy cargo thereon up off the ground.

Connecting the upper and lower frames at each end is a double scissors linkage 74 which stabilizes and maintains the frames substantially parallel to each other when the unit or trailer is tilted. Each double scissors linkage 74 has a lower arm 76 pivotally connected to the lower frame and upper arm 78 pivotally connected to the upper frame, an upper arm end 80 which slidably engages member 82 on the upper frame, and a lower arm end 84 which slidably engages member 86 on the lower frame. The linkages are pivotally connected together by upper pivot pin 88 and lower pivot pin 90.

A power unit 92 which supplies fluid pressure to the primary, secondary and tilt rams is mounted on a support frame 94 which is pivotally mounted on a member 96 which is supported on one corner of the lower frame so that the power unit 92 may be swung from a position over the load conveying means when the upper frame is in its lowered position to alternative positions outboard of the frames either to the side as shown in FIG. 1 or to the rear when the conveyor rollers are arranged for transverse movement of loads.

As shown in FIG. 2, the titlt rams 70 are connected in such a way to the power unit 62 that only the tilt rams on the same side of the trailer can be operated simultaneously, thereby ensuring solely a lateral tilting action. The power unit 62 contains a tank or reservoir of hydraulic fluid, a pump and a motor (all not shown) for driving the pump which may be controlled by electrical switches. Hydraulic fluid from the pump enters distributing valves 98 and 100, each valve controlling one pair of tilt rams, and is directed to the tilt rams. The fluid extends one pair of tilt rams by flowing from the pump through valve 98 to the inlets 102 of the rams 70 while return flow is conducted from the outlets 104 through the valve 98 to the tank. The valves 98 and 100 are conventional solenoid operated three-position valves by which each pair of rams can be extended, retracted or locked in any intermediate position. The two valves are illustrated in their ram extending positions; the center cores of the valves are each rotated one-eighth of a turn to lock the rams and one-quarter of a turn to retract the rams.

An operator 52 standing on platform 30 controls the raising and lowering and tilting of the unit by means of control switches 106 mounted on the end of a long flexible cable 108. When the trailer is in position beside the fuselage of an aircraft, the operator first operates both valves 98 and 100 to extend the rams 70 to a sufficient extent that the rams 70 lift the trailer's wheels off of the ground and prevent the trailer from rolling while it is in use. The operator then actuates the controls for power unit 92 to supply hydraulic fluid to the rams 58 and 60 while the upper frame is in its lower position; the hydraulic fluid supplied to auxiliary rams 60 lifts the upper frame to a sufficient intermediate height that the effective angle for application of thrust from the primary rams 58 to the upper frame is sufficiently great that the primary rams take over and lift the upper frame away from the secondary rams 60 and upwardly toward the high lift position. When the upper frame reaches the elevation of the fuselage, the operator selectively operates the valves 98 and 100 to tilt the trailer until the upper frame is parallel to the door sill of the cargo hatch.

While one specific embodiment of the invention has been illustrated and described in detail herein, it is obvious that many modifications thereof may be made without departing from the spirit and scope of the invention.

What is claimed is:

1. An elevator for loading cargo into aircraft comprising: a lower frame adapted to be supported on the ground adjacent to an aircraft; an upper frame having conveyor means thereon for conveying cargo in a horizontal direction across said upper frame; scissors lift arms extending parallel to a vertical plane parallel to said horizontal direction and interconnecting said frames for supporting said upper frame on said lower frame generally parallel to said lower frame while permitting said upper frame to move between a high lift position above said lower frame and a lowered position below said high lift position; and, auxiliary scissors lift arms extending parallel to a vertical plane perpendicular to said horizontal direction; lift means for moving said upper frame between said positions; a pair of extendable feet mounted on said lower frame on each side of a median line through said lower frame parallel to said horizontal direction; and a single operating means for extending the feet of each pair to tilt said elevator horizontally when said upper frame is in said high lift position.

2. An elevator comprising a generally rectangular lower frame having a pair of generally parallel short sides and a pair of generally parallel long sides, an upper frame having a generally rectangular configuration similar to said lower frame and superposed on said lower frame, two pairs of long scissors lift arms with the arms of each pair extending generally parallel to vertical planes through said long sides and pivotally connected together intermediate of their ends at pivotal axes which are generally perpendicular to said planes, each of said pairs of long arms having one end of each arm pivotally connected to each of said upper and lower frames at adjacent ends of said frames and the other end of each arm slidably connected to the other frame adjacent to the opposite ends of said frames, two sets of double cross scissors arms with the arms of each set pivotally connected together about pivotal axes which are parallel to said vertical planes and with said arms extending adjacent to and parallel to vertical planes through said short sides of said lower frame, each of said sets of double cross arms having one arm end pivotally connected to each of said frames at adjacent long sides of said frames and another arm end slidably connected to each of said frames near the other adjacent long sides of said frames, and power means for raising said upper frame above said lower frame, in which a plurality of ground engaging wheels are mounted on said lower frame; two pairs of extendable, downwardly facing rams are mounted on said lower frame with one pair adjacent to each of said long sides of said lower frame and with said rams extendable to positions below said wheels to lift said wheels off the ground, and control means are connected to said pairs of rams for extending and retracting the rams of each pair independently of the rams of the other pair to tilt said short sides of said frames.

3. An elevator for loading cargo into aircraft comprising: a lower frame adapted to be supported on the ground adjacent to an aircraft; an upper frame having conveyor means thereon for conveying cargo in a horizontal direction across said upper frame; scissors lift arms interconnecting said frames for supporting said upper frame on said lower frame generally parallel to said lower frame while permitting said upper frame to move between a high lift position above said lower frame and a lowered position below said high lift position; lift means for moving said upper frame between said positions; a pair of extendable feet mounted on said lower frame on each side of a median line through said lower frame parallel to said horizontal direction; and a single operating means for extending the feet of each pair to tilt said elevator horizontally when said upper frame is in said high lift position.

4. An elevator for loading cargo into aircraft comprising: a lower frame adapted to be supported on the ground adjacent to an aircraft, an upper frame having conveyor means thereon for conveying cargo in a horizontal direction across said upper frame, lift means for supporting said upper frame on said lower frame and moving said upper frame between raised and lowered positions, a pair of extendable lifts mounted on said lower frame on each side of a median line through said lower frame parallel to said horizontal direction, and a single operating means for extending the lifts of each pair to tilt said elevator horizontally when the upper frame is in said high lift position.

References Cited
UNITED STATES PATENTS 2,831,588 4/1958 Seed _____ 214—38
3,164,274 9/1961 Herrmann _____ 214—512

GERALD M. FORLENZA, *Primary Examiner.*

ALBERT J. MAKAY, *Examiner.*